(12) United States Patent
Sanghi et al.

(10) Patent No.: US 8,989,071 B2
(45) Date of Patent: Mar. 24, 2015

(54) INTER-CHIP DATA COMMUNICATIONS WITH POWER-STATE TRANSITION MANAGEMENT

(71) Applicant: Apple Inc., Cupertino, CA (US)

(72) Inventors: Karan Sanghi, Mountain View, CA (US); Ben-Heng Juang, Milpitas, CA (US); Arjuna Sivasithambaresan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 121 days.

(21) Appl. No.: 13/755,743

(22) Filed: Jan. 31, 2013

(65) Prior Publication Data

US 2014/0064167 A1 Mar. 6, 2014

Related U.S. Application Data

(60) Provisional application No. 61/695,601, filed on Aug. 31, 2012.

(51) Int. Cl.
*G08C 17/00* (2006.01)
*H04W 52/02* (2009.01)

(52) U.S. Cl.
CPC .................. *H04W 52/0209* (2013.01)
USPC ......................................... 370/311; 370/474

(58) Field of Classification Search
CPC ................................................... H04W 52/00
USPC ......... 370/311, 389, 392–393, 428–429, 474, 370/476
See application file for complete search history.

(56) References Cited

U.S. PATENT DOCUMENTS

| 7,477,616 | B2 | 1/2009 | Wang et al. |
| 7,558,557 | B1 | 7/2009 | Gollnick |
| 7,834,599 | B2 * | 11/2010 | von Kaenel .................. 323/242 |
| 7,979,097 | B2 * | 7/2011 | Hussain ........................ 455/574 |
| 8,270,329 | B2 | 9/2012 | Hui et al. |
| 8,362,805 | B2 * | 1/2013 | Suzuki et al. .................... 326/93 |
| 8,368,355 | B2 * | 2/2013 | Tam .............................. 320/128 |
| 8,421,499 | B2 * | 4/2013 | Takayanagi et al. ............ 326/33 |
| 8,476,930 | B2 * | 7/2013 | Campbell et al. ............... 326/68 |
| 8,514,817 | B2 | 8/2013 | Jaatinen et al. |
| 2008/0123577 | A1 * | 5/2008 | Jaakkola et al. ............... 370/311 |
| 2010/0083026 | A1 * | 4/2010 | Millet et al. .................. 713/601 |

* cited by examiner

*Primary Examiner* — Kevin Mew
(74) *Attorney, Agent, or Firm* — Meyertons, Hood, Kivlin, Kowert & Goetzel, P.C.

(57) ABSTRACT

A method includes inter-chip data communications between a power-managed integrated circuit (IC) and a peer IC. The peer IC generates a data frame and prepends a discardable preamble of a predefined size to a payload of the data frame. The predefined size is a size not less than a size of data discarded by the power-managed IC upon the power-managed IC receiving a data frame while in a low-power state. The peer IC transmits the data frame to the power-managed IC. The power-managed IC, while in a low-power state, may receive the data frame from the peer IC and in response to receiving the data frame, begin exiting the low-power state. The power-managed IC, while exiting the low-power state, may discard a portion of the data frame such as for example, some or all of the discardable preamble, without discarding payload.

20 Claims, 7 Drawing Sheets

INTER-CHIP DATA COMMUNICATIONS WITH POWER-STATE TRANSITION MANAGEMENT

PRIORITY INFORMATION

This application claims the benefit of U.S. Provisional Application No. 61/695,601, entitled "Inter-Chip Data Communications With Power-State Transition Management," filed Aug. 31, 2012.

BACKGROUND

1. Technical Field

This disclosure relates generally to wireless communication systems and devices, and more particularly to methods, apparatus, and integrated circuits for inter-chip data communications with power-state transition management.

2. Description of the Related Art

In recent years, wireless devices such as smart phones and tablet computers have become increasingly sophisticated. In addition to supporting telephone calls, many mobile devices now provide access to the internet, email, text messaging, and navigation using the global positioning system (GPS). Furthermore, many mobile devices are capable of operating sophisticated applications, many of which may utilize the functionality mentioned above. Wireless devices that support such sophisticated functionality often include many components, each of which consume power. Power in such wireless devices is often provided by a battery. As such, there is often a tradeoff between controlling power consumption of the many components of a wireless device and increasing performance of those same components.

SUMMARY

Various example methods for inter-chip data communications are disclosed. One example method of inter-chip data communications between a power-managed integrated circuit (IC) and a peer IC includes generating, by the peer IC, a data frame to be transmitted to the power-managed IC. The peer IC, in generating the data frame, may also prepend a discardable preamble of a predefined size to a payload of the data frame. The predefined size of discardable preamble may be a size not less than a size of data discarded by the power-managed IC upon the power-managed IC receiving a data frame while in a low-power state. The peer IC may then transmit the data frame, with the discardable preamble, to the power-managed IC.

In some embodiments, the power-managed IC may receive a data frame with a discardable preamble from a peer IC while the power-managed IC is in a low-power state. In response to receiving the data frame, the power-managed IC may begin to exit the low-power state and discard a portion of the data frame while exiting the low-power state. The portion of the data frame discarded by the power-managed IC may be no greater in size than the size of the discardable preamble. That is, the power-managed IC may discard a portion of the data frame without discarding any payload data.

Figure 1:
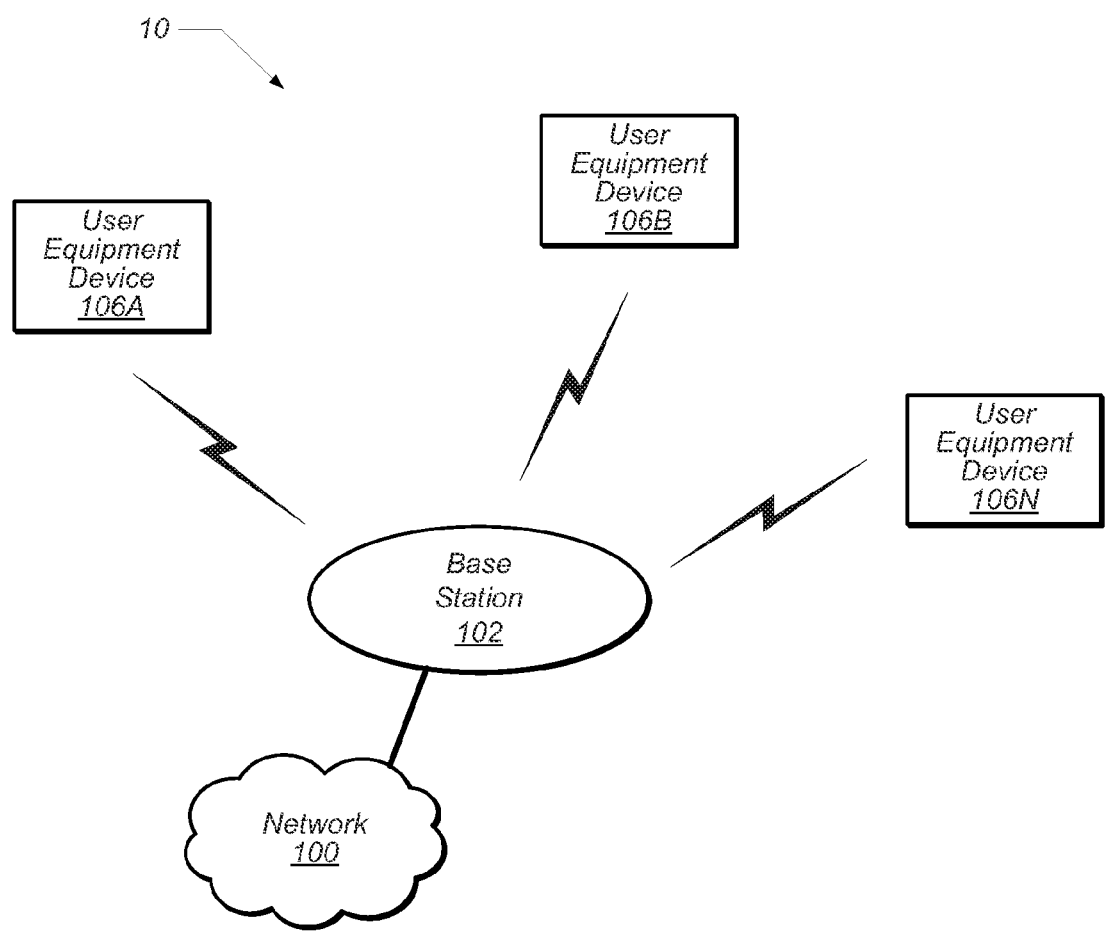
FIG. 1 sets forth a block diagram of one embodiment of a wireless communication system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

FIG. 1 sets forth a block diagram of one embodiment of a wireless communication system. The system of FIG. 1 is one example of any of a variety of wireless communication systems. The wireless communication system 10 includes a base station 102 which communicates over a wireless transmission medium such as, for example, an over the air interface with one or more user equipment (UE) devices, 106A through 106N. The base station 102 is also coupled a network 100 via another interface, which may be wired or wireless. Components identified by reference designators that include both a number and a letter may be referred to by the number only where appropriate.

The base station 102 may be a base transceiver station (BTS) or cell site, and may include hardware that enables wireless communication with one or more of the UEs 106. The base station 102 may also be equipped to communicate with the network 100. Thus, the base station 102 may facilitate communication between the UEs 106 and/or between the UEs 106 and the network 100. The communication area (or coverage area) of the base station 102 may be referred to as a "cell." In various embodiments, the base station 102 and the UEs may be configured to communicate over the transmission medium using any of various wireless communication radio access technologies such as LTE, eHRPD, GSM, CDMA, WLL, WAN, WiFi, WiMAX, etc. In embodiments that communicate using the eHRPD standard, the BTS 102 may be referred to as an HRPD BTS, and the network 100 may include an eAN/ePCF and a number of gateways including HRPD gateway (HSGW), a PDN gateway (P-GW), and a number of policy and packet control functions that may be associated with a service provider, for example.

In one embodiment, each of the UEs 106A-106N may be representative of a device with wireless network connectivity such as a mobile phone, a hand-held device, a computer or a tablet, or virtually any type of wireless device. As described further below, the UE 106 may include at least one processor that is configured to execute program instructions stored in a memory. Accordingly, in some embodiments, the UE 106 may perform one or more portions of the functionality described below by executing such stored instructions. However, in other embodiments, the UE 106 may include one or more hardware elements and/or one or more programmable hardware elements such as an FPGA (field-programmable gate array) that may be configured to perform the one or more portions the functionality described below. In still other embodiments, any combination of hardware and software may be implemented to perform the functionality described below.

In the system 10 of FIG. 1, any of the UEs 106 may include a power-managed integrated circuit (IC) and peer IC. Either of the ICs may be implemented as any one of a variety of components including, for example, a processor, memory management unit, an I/O interface, a wireless communication receiver, a wireless communication transmitter, and others.

The power-managed IC is referred to as 'power-managed' in that the IC is configured to vary between a low power-state and one or more other power-states. Such an IC, for example, may enter a low-power state after a predefined time of inactivity. In the low-power state, one or more components of the power-managed IC may be powered down or off, the IC's core operating voltage may be reduced, the IC's clock speed may be throttled, and other functionality may be otherwise reduced. In this way, the power-managed IC consumes less power in a low-power state than when operating in a higher-power state.

The peer IC is referred to as a 'peer' in that the peer IC is coupled for data communications to the power-managed IC. The peer IC may communicate with the power-managed IC by transmitting one or more data frames serially to the power-managed IC over a bus or other data communications link.

The peer IC of a UE 106 in the example system of FIG. 1 may be configured to generate a data frame for transmission to the power-managed IC of the UE 106. In response to receiving a data frame from the peer IC when the power-managed IC is in a low-power state, the reception of a data frame initiates an exit from the low-power state. At the time the power-managed IC begins an exit from the low-power state, and for some time thereafter, components of the power-managed IC configured to process the received data may not be in a fully operational state. For this reason, the power-managed IC may, while exiting the low-power state, drop or discard a portion of the received data frame while exiting the low-power state.

To reduce the probability of the power-managed IC dropping useful payload data from a data frame while exiting a low-power state, the peer IC of a UE 106 may also be configured to prepend a discardable preamble of a predefined size to a payload while generating the data frame. The term 'prepend' as used here refers to generating a preamble to be transmitted prior to, or before, a payload. The predefined size of the preamble may be a size not less than a size of data discarded by the power-managed IC upon the power-managed IC receiving a data frame while in a low-power state. The discardable preamble may include a predefined value recognizable by the power-managed IC, such as a value of '0' for each bit of every byte of the preamble, a value of '1' for each bit of every byte of the preamble, or some other predefined pattern of bits.

The term 'payload' as used here refers to encoded information intended to be received and processed by a receiver (in this example a power-managed IC). Such a payload is contrasted with a discardable preamble as the term is used here. A discardable preamble contains no encoded information intended by a transmitter of the preamble to be processed or consumed by the receiver. In fact, the transmitter of the data frame intends for the entire discardable preamble to be completely discarded.

After generating the data frame with the discardable preamble prepended to the data frame's payload, the peer IC transmits the data frame. The peer IC may transmit the data frame serially, such that the discardable preamble is the first data transmitted to the power-managed IC followed by payload data.

The power-managed IC of the UE 106 may then receive the data frame from the peer IC. If the power-managed IC is in a low-power state, the reception of the data frame causes the power-managed IC to begin to exit the low-power state. During the exit, the power-managed IC may discard a portion of the data frame where the discarded portion is of a size not greater than the size of the discardable preamble. That is, the portion of the data frame discarded is some portion, up to the entirety, of the discardable payload. In this way, the power-managed IC may discard, while exiting, a portion of the data frame that includes only discardable preamble data without discarding payload data. As such, there is no need for the peer IC to re-transmit discarded payload data.

In some embodiments, the peer IC may transmit a data frame with a discardable preamble to the power-managed IC even when the power-managed IC is not a low-power state. If the power-managed IC is not in a low-power state when the power-managed IC receives the data frame from the peer IC, the power-managed IC may discard the preamble and process the payload.

It is noted that the peer IC and power-managed IC may, at times, swap roles. That is, the peer IC in may also be configured to vary between power-states and the power-managed IC may be configured to prepend discardable preamble to data frames intended for the peer IC. Any IC may be configured as a peer IC, as a power-managed IC, or as both.

Figure 2:
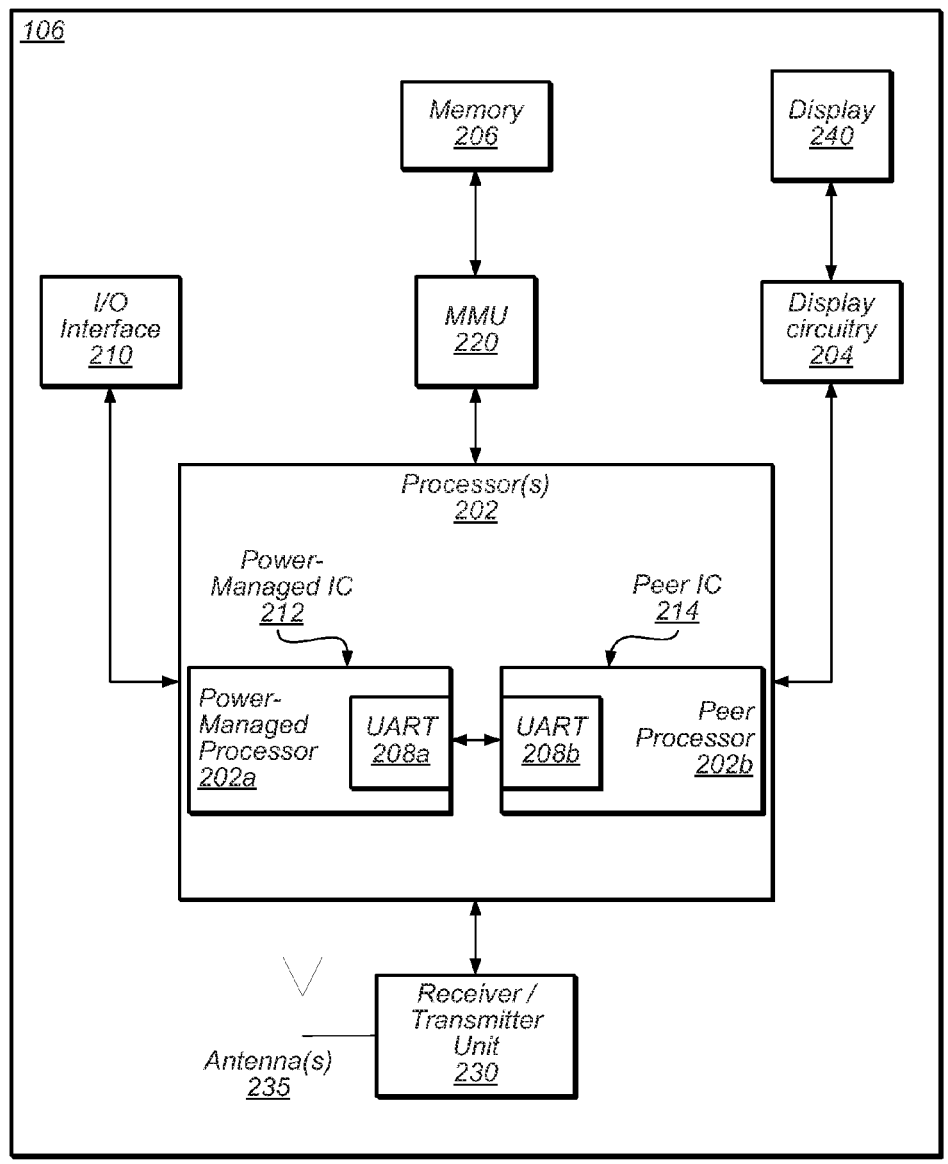
FIG. 2 sets forth a block diagram of one embodiment of a wireless communication device shown in FIG. 1.

For further explanation, FIG. 2 sets forth a block diagram of one embodiment of a wireless communication device shown in FIG. 1. The UE 106 includes one or more processors 202 (or one or more processor cores 202) which are coupled to display circuitry 204 which is in turn coupled to the display 240. The display circuitry 204 may be configured to perform graphics processing and provide display signals to the display 240.

The one or more processors 202 are also coupled to a memory management unit (MMU) 220 and to a receiver/transmitter (R/T) unit 230. The MMU 220 is coupled to a memory 206. The UE 106 also includes an I/O interface 210 that is coupled to the processor(s) 202, and may be used for coupling the UE 106 to a computer system, or other external device. It is noted that in one embodiment the components shown within UE 106 of FIG. 2 may be manufactured as stand alone components. In other embodiments, however, various ones of the components may be part of one or more chipsets or part of a system on chip (SOC) implementation.

In various embodiments, the processors 202 may be representative of a number of different types of processors that may be found in a wireless communication device. For example, the processors 202 may include general processing capability, digital signal processing capability, as well as hardware accelerator functionality, as desired. The processors 202 may include baseband processing and therefore may digitally process the signals received by the R/T unit 230. The processors 202 may also process data that may be transmitted by the R/T unit 230. The processors 202 may also perform a number of other data processing functions such as running an operating system and user applications for the UE 106.

In one embodiment, the MMU 220 may be configured to receive addresses from the one or more processors 202 and to translate those addresses to locations in memory (e.g., memory 206) and/or to other circuits or devices, such as the display circuitry 204, R/T unit 230, and/or display 240. The MMU 220 may also return data to one or more of the processors 202 from the locations in memory 206. The MMU 220 may be configured to perform memory protection and page table translation or set up. In some embodiments, the MMU 220 may be included as a portion of one or more of the processors 202.

The R/T unit 230 may, in one embodiment, include analog radio frequency (RF) circuitry for receiving and transmitting RF signals via the antenna 235 to perform the wireless communication. The R/T unit 230 may also include down-conversion circuitry to lower the incoming RF signals to the baseband or intermediate frequency (IF) as desired. For example, the R/T unit 230 may include various RF and IF filters, local oscillators, mixers, and the like. Since the UE 106 may operate according to a number of radio access technologies, the R/T unit 230 may include a corresponding number of RF front end portions to receive and down-convert, as well as up-convert and transmit the respective RF signals of each technology.

In some embodiments, inter-chip data communications between a peer IC 214 and a power-managed IC 212 as mentioned above may be implemented with processors. The processors 202 in the UE 106 of FIG. 2, for example, include a power-managed IC 212 implemented as a power-managed processor 202a and a peer IC 214 implemented as a peer processor 202b, each of which may be configured for inter-chip data communications as described above. In various embodiments, the processors 202 may execute software stored within a memory, such as memory 206 for example, to perform functionality associated with inter-chip data communications as mentioned above. In other embodiments, the processors 202 may include hardware configured to perform inter-chip data communications as described above. In the UE 106 of FIG. 2, for example, the each of the power-managed processor 202a and the peer processor 202b includes a Universal Asynchronous Receiver/Transmitter (UART) (208a, 208b) that is configured to perform functionality associated with inter-chip data communications mentioned above.

UART is a hardware component configured to translate data between parallel and serial forms. UARTs are commonly used in conjunction with communication standards such as EIA, RS-232, RS-422, or RS-485. The 'universal' designation indicates that the data format and transmission speeds are configurable and that the actual electric signaling levels and methods, such as differential signaling and the like, are typically handled by a special driver circuit (not shown in FIG. 2) external to the UART. It is noted that UARTs are but one example serial communications component among a variety of possible components that may be configured to perform inter-chip data communications as mentioned above. Other examples include a serial peripheral interface (SPI), inter-integrated circuit (I2C), and the like.

Figure 3:
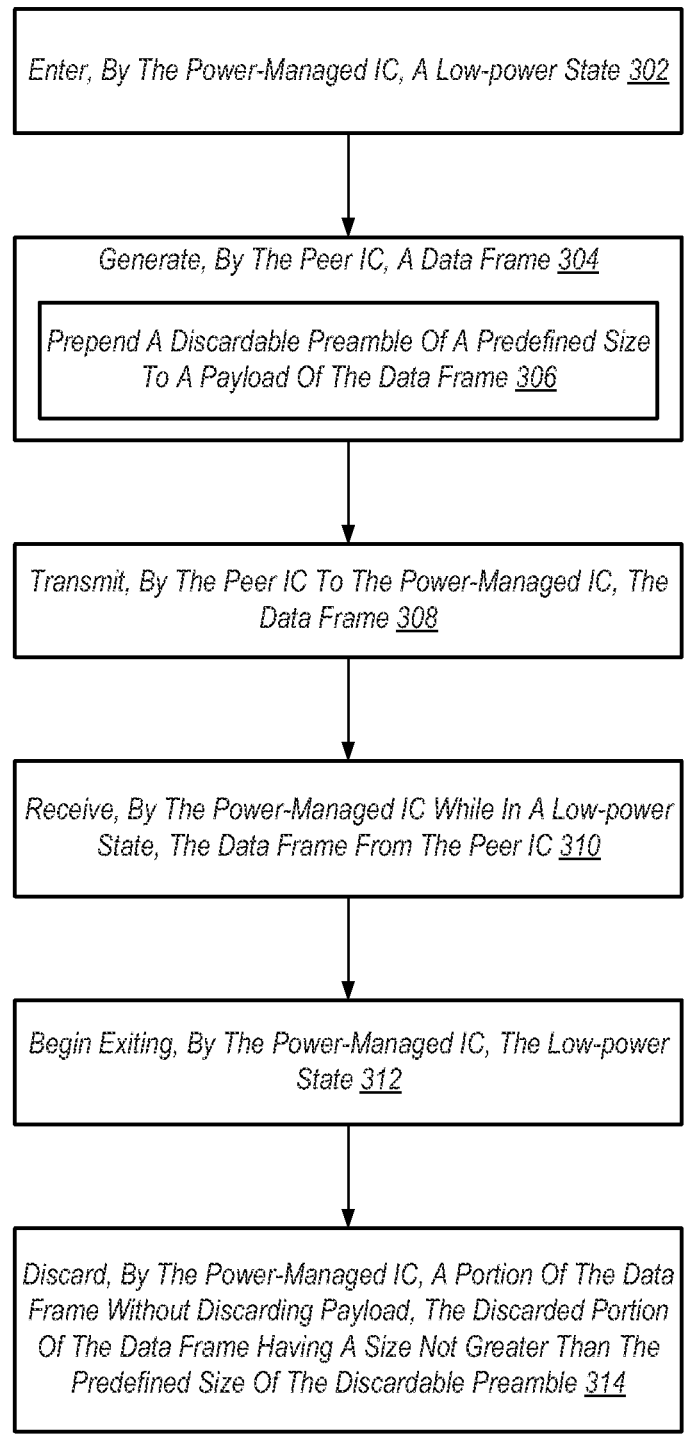
FIG. 3 sets forth a flow chart illustrating an exemplary method of inter-chip data communications.

For further explanation, FIG. 3 sets forth a flow chart illustrating an exemplary method of inter-chip data communications. Portions of the method of FIG. 3 may be carried out by one or more components of the example UE 106 of FIG. 2, such as the power-managed IC 212 and the peer IC 214. For this reason and for purposes of clarity, the description of the method of FIG. 3 refers to components of FIG. 2.

In the method of FIG. 3, the power-managed IC 212 may enter into a low-power state (block 302). The power-managed IC 212 may enter into a low-power state (block 302) for a variety of reasons, including for example, due to inactivity for a predefined period of time. The power-managed IC may maintain an internal timer that begins at a predefined amount of time and continually counts down. Upon activity, the timer may be restarted, and countdown may begin again. When the timer reaches zero, the power-managed IC 212 may enter the low-power state.

The peer IC 214 in the example of FIG. 3 may generate a data frame (block 304). The peer IC 214 may generate a data frame for various reasons. For example, a software application or hardware component may cause the peer IC 214 to generate the data frame from purposes of data transmission to the power-managed IC 212. The peer IC may, in generating the data frame, prepend a discardable preamble of a predefined size to a payload of the data frame (block 306). The predefined size may be a size not less than a size of data discarded by the power-managed IC 212 upon the power-managed IC receiving a data frame while in a low-power state. For example, if a power-managed IC typically discards 32 bytes of data upon reception of a data frame while in a low-power state, the discardable preamble may be no less than 32 bytes in size.

Once the peer IC 214 generates the data frame, the peer IC 214 may transmit the data frame to the power-managed IC 212 (block 308). The peer IC 214 may transmit the data frame serially to the power-managed IC 212, beginning with the discardable preamble, followed by the payload of the data frame.

The power-managed IC 212, while in a low-power state may receive the data frame from the peer (block 310). In response to receiving the data frame, the power-managed IC 212 may then begin exiting the low-power state (block 312).

During the exit, the power-managed IC may increase power supply, increase clock frequency, disable power gates, disable clock gates, and the like to one or more components so that the components are fully operational. At the time the data frame is received and the power-managed IC begins the exit from the low-power state, however, the components of the power-managed IC 212 responsible for processing data received from the peer IC 214 are not fully operation. As such, the power-managed IC may discard a portion of the data frame while exiting the low-power state (block 314). The portion of the data frame that the power-managed IC discards may be of a size not greater than the size of the discardable preamble of the data frame. Consider, for example, that the discardable preamble is 32 bytes in size (length). In such an example embodiment, the power-managed processor may discard any portion of the first 32 bytes of the data frame. In this way, the power-managed IC may discard a portion of the data frame without discarding any of the payload of the data frame.

Figure 4:
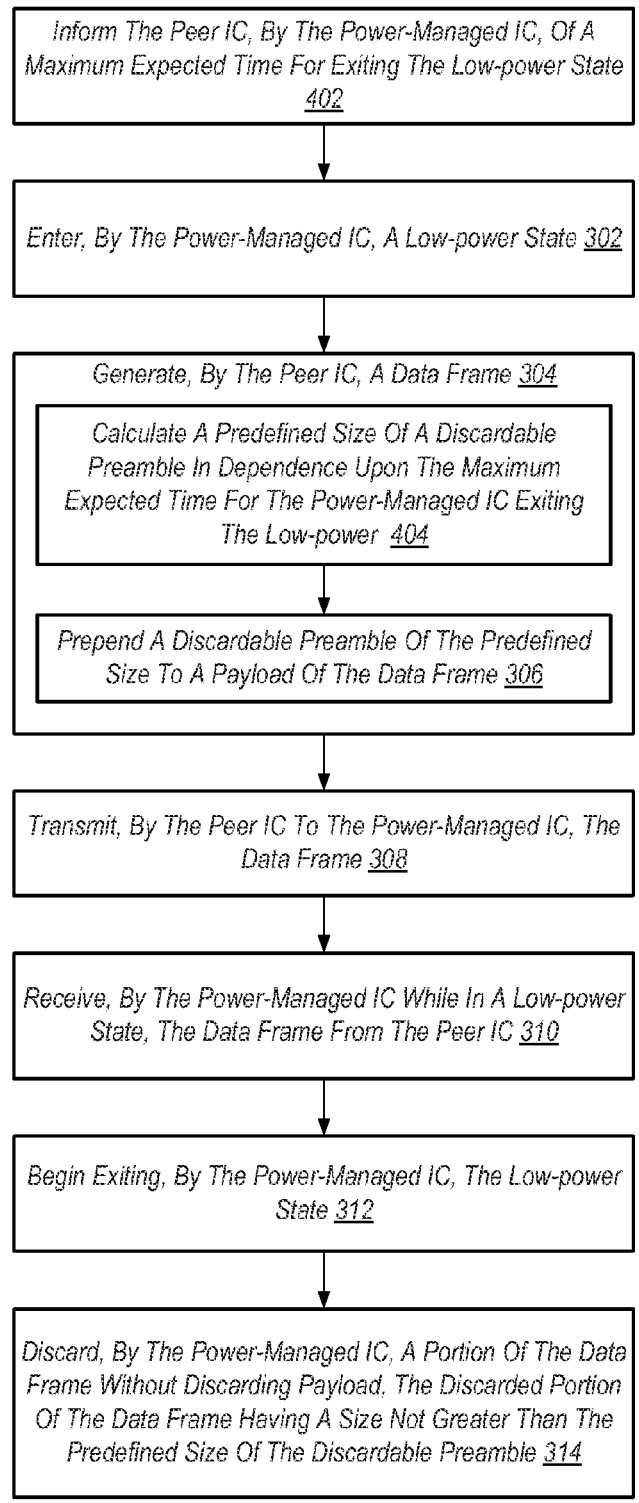
FIG. 4 sets forth a flow chart illustrating another exemplary method of inter-chip data communications in which a peer IC calculates a size of a discardable frame preamble.

For further explanation, FIG. 4 sets forth a flow chart illustrating another exemplary method of inter-chip data communications. The method of FIG. 4 is similar to the method of FIG. 3 in that portions of the method of FIG. 4 may also be carried out one or more components of the example UE 106 of FIG. 2, such as the power-managed IC 212 and the peer IC 214. For this reason and for purposes of clarity, the description of the method of FIG. 4 refers to components of FIG. 2. The method of FIG. 4 is also similar to the method of FIG. 3 in that the method of FIG. 4 includes many of the same blocks, where the corresponding blocks are numbered the same and operate in manner described above, with variations described below.

In the method of FIG. 4, prior to the power-managed IC 212 entering a low-power state (block 302), the power managed IC 212 may inform the peer IC 214 of a maximum expected time for exiting the low-power state. The maximum expected time for exiting the low-power state is a maximum expected duration between a time the power-managed IC begins to exit the low-power state and a time at which the components of the power-managed IC 212 to become fully operational. The maximum expected time for exiting the low-power state is said to be 'expected' because the actual time required to become fully operational from a low-power state may vary slightly with varying operating and environmental conditions.

The peer IC 214 when generating a data frame (block 304) in the method of FIG. 4 may calculate a predefined size of a discardable preamble of the data frame in dependence upon the maximum expected time for the power-managed IC to exit the low-power state (block 404). That is, the size of the discardable preamble may vary in the method of FIG. 4 with the time expected for the power-managed IC to exit the low-power state. The longer the power-managed IC 212 takes to fully exit the low-power state, the longer the components of the power-managed IC 212 responsible for processing received frame data take to become fully operation. Thus, the longer the power-managed IC 212 takes to fully exit the low-power state, the greater the size of data discarded by the power-managed processor during the exit process. The peer IC 214 in the method of FIG. 4, given the maximum expected time for the power-managed IC 212 to exit the low-power state, may calculate a size of the discardable preamble so as to insure that the preamble is large enough in size to insure that the power-managed processor discards only portions of the preamble rather than payload data. Further, peer IC 214 may calculate the size of the discardable preamble so as to insure that the preamble is not needlessly large in size.

Figure 5:
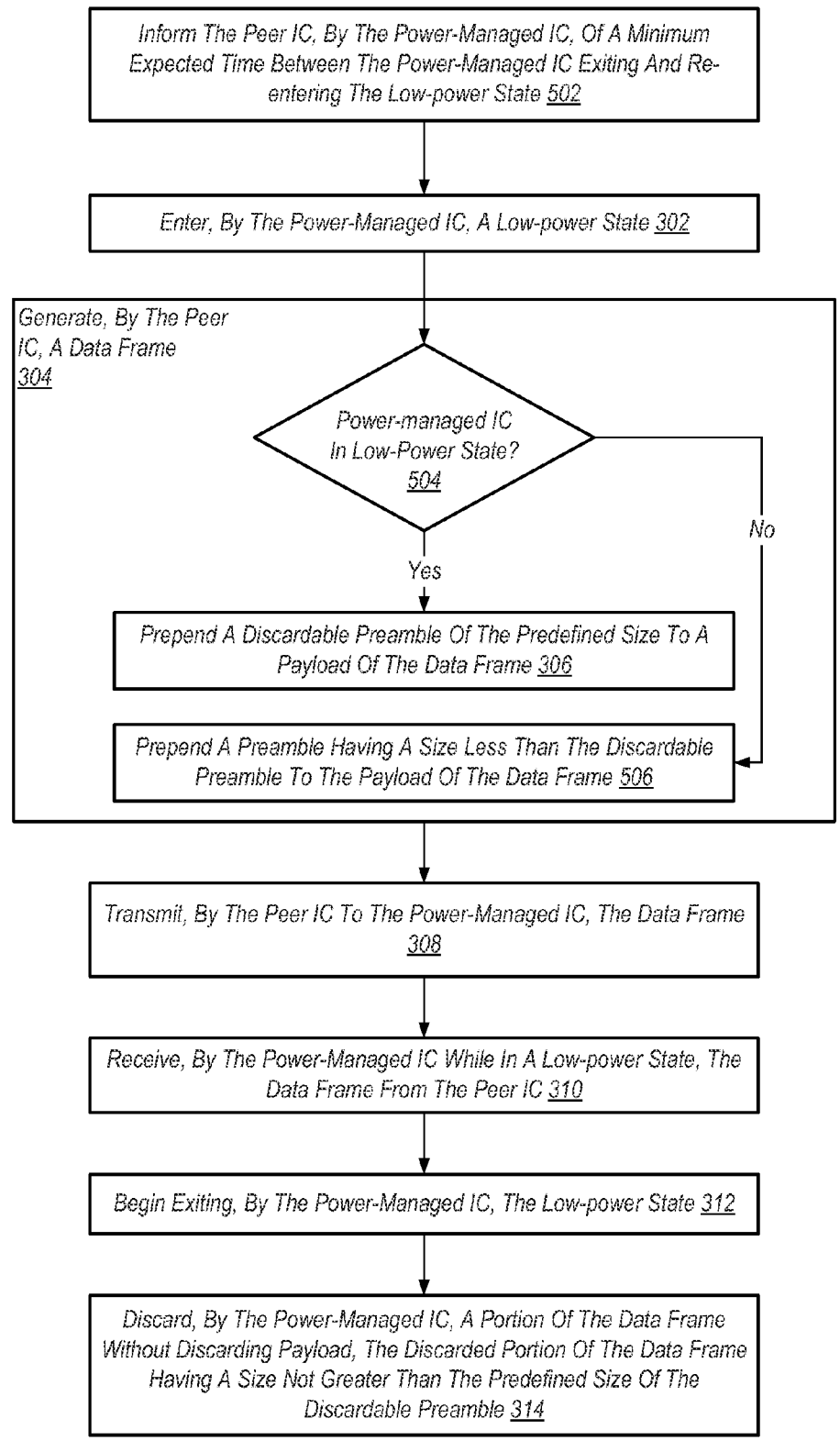
FIG. 5 sets forth a flow chart illustrating another exemplary method of inter-chip data communications in which a peer IC dynamically determines whether to prepend a discardable preamble to the payload of a data frame.

For further explanation, FIG. 5 sets forth a flow chart illustrating another exemplary method of inter-chip data communications. The method of FIG. 5 is also similar to the method of FIG. 3 in that the method of FIG. 5 may be carried out one or more components of the example UE 106 of FIG. 2, such as the power-managed IC 212 and the peer IC 214, and the method of FIG. 5 includes many of the same blocks as FIG. 3, where the corresponding blocks are numbered the same and operate in manner described above, with variations described below.

The power-managed IC 212, prior to entering a low-power state (block 302) in the method of FIG. 5, may inform the peer IC 214 of a minimum expected time between the power-managed IC exiting and re-entering the low-power state (block 502). The minimum expected time between the power-managed IC exiting and re-entering the low-power state is the minimum duration of time the power-managed IC will not be in the low-power state. In some embodiments, as mentioned above, the power-managed IC may be configured to enter a low-power state after a predefined period of inactivity. In some embodiments, then, the minimum amount of time that a power-managed IC may be fully operation before re-entering a low-power state may be the predefined period of inactivity.

Once informed of the minimum expected time in the method of FIG. 5, the peer IC 214, may, in generating a data frame for transmission to the power-managed IC 212 (block 304), determine whether the power-managed IC is currently in a low-power state in dependence upon a time of the power-managed IC's most recent exit from the low-power state and the minimum expected time between exiting and re-entering the low-power state (block 504). To determine whether the power-managed IC 212 is currently in a low-power state, the peer IC 214 may calculate a duration of time since the power-managed IC 212 most recently exited from the low-power state. The peer IC 214 may then compare the calculated duration to the minimum expected time before re-entering the low-power state. If the calculated duration is greater than or equal to the minimum expected time before re-entering the low-power state, the peer IC 214 may determine that the power-managed IC 212 is currently in a low-power state. If the calculated duration is less than the minimum expected time before re-entering the low-power state, the peer IC 214 may determine that the power-managed IC 212 is not currently in a low-power state.

It is noted that the outcome of the determination as to whether the power-managed IC is currently in a low-power state (block 504) may not be accurate in all cases. That is, the peer IC may not be absolutely certain at all times as to whether the power-managed IC is currently in the low-power state. Instead, given the minimum expected time between exiting and re-entering the low-power state (which, by its very nature as a maximum, is an approximation of sorts), the peer IC makes an educated guess as to whether the power-managed IC is currently in a low-power state. In embodiments in which the power-managed IC is not currently in the low-power state but receives a data frame with a discardable preamble, the power-managed IC may discard the preamble and process the payload as mentioned above.

The peer IC 214 may then prepend a discardable preamble to the payload of the data frame (block 306) only if the peer IC determines that the power-managed IC 212 is currently in the low-power state. If the peer IC 214 determines that the power managed IC 212 is not currently in the low power state, the peer IC 214 may prepend a preamble that is not discardable—a preamble having a size less than the size of the discardable preamble—to the payload of the data frame (block 506). In another embodiment, the peer IC 214 may not prepend any preamble if the peer IC 214 determines that the power managed IC 212 is not currently in the low power state. In this way, the peer IC 214 is configured to reduce superfluous data traffic when the peer IC has determined that the power-managed IC is not in a low-power state and thus will not discard a portion of the data frame while exiting the low-power state.

Figure 6:
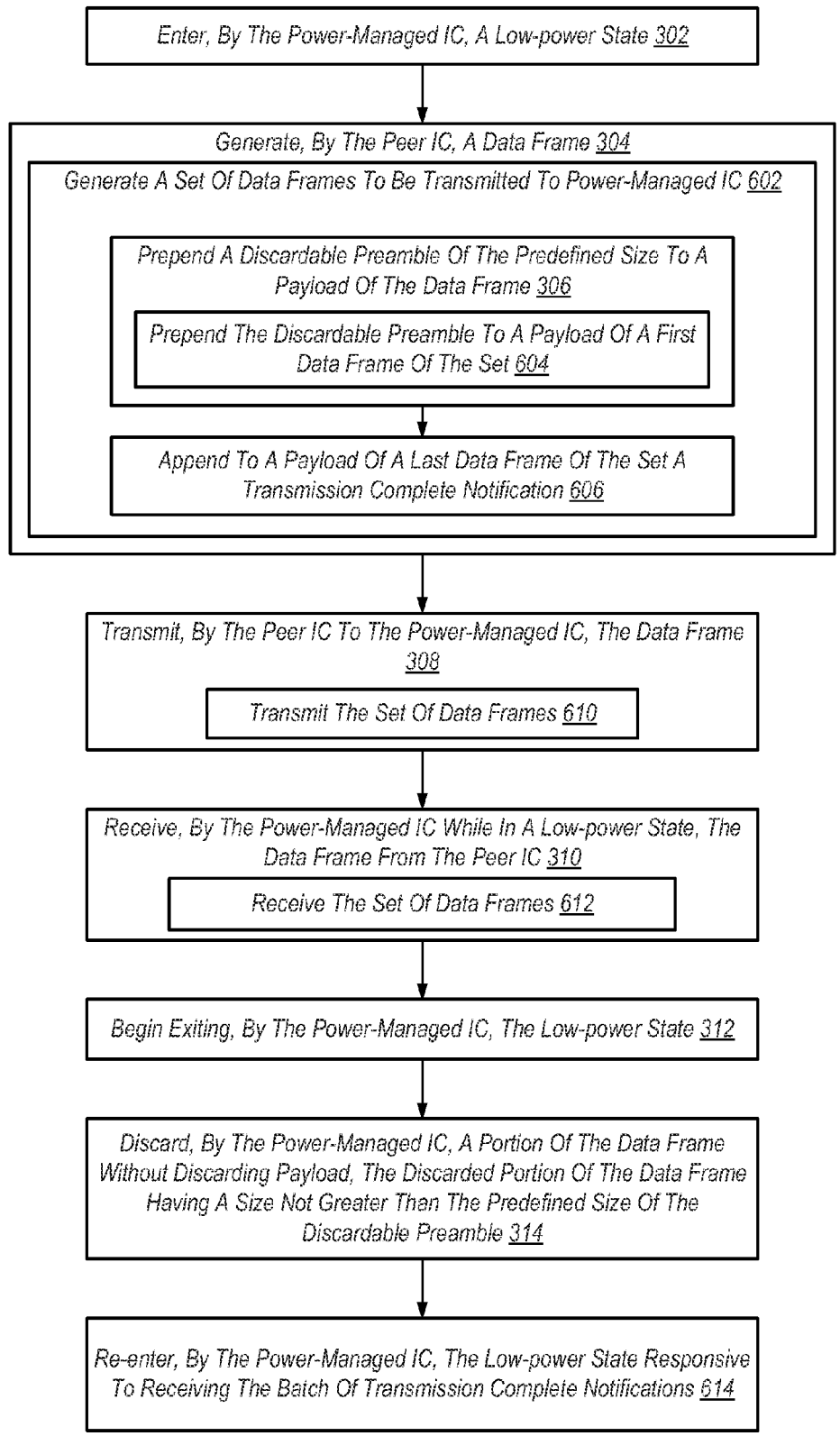
FIG. 6 sets forth a flow chart illustrating another exemplary method of inter-chip data communications in which a power-managed IC exits from a low-power state to receive a set of data from a peer IC and re-enters the low-power state aggressively.

For further explanation, FIG. 6 sets forth a flow chart illustrating another exemplary method of inter-chip data communications. The method of FIG. 6 is also similar to the method of FIG. 3 in that the method of FIG. 6 may be carried out by one or more components of the example UE 106 of FIG. 2, such as the power-managed IC 212 and the peer IC 214, and the method of FIG. 6 includes many of the same blocks as FIG. 3, where the corresponding blocks are numbered the same and operate in manner described above, with variations described below.

The peer IC 214 may generate a set of data frames to be transmitted to the power-managed IC 212 (block 602) and may prepend a discardable preamble to a first data frame of the set (block 604). As mentioned above, the power-managed IC 212 may be configured to enter the low-power state after a predefined period of inactivity. The peer IC 214, however, may be configured to send the data frames of the set one after another, with little time in between the frames. While the first data frame may cause the power-managed IC 212 to exit the low-power state, the following data frames prohibit the power-managed IC from re-entering the low-power state. As such, the power-managed IC 212 may discard data only from the first data frame during the exit from the low-power state.

The peer IC 214 in the method of FIG. 6 may also append a transmission complete notification to a payload of a last data frame of the set of data frames to be transmitted to the power-managed IC 212 (block 606). The term 'append' as used here refers to generating a transmission complete notification to be transmitted after a payload. The transmission complete notification may be a predefined value or a flag, recognize and well known by the power-managed IC, that indicates the completion of a transmission of a set of frames and some time with no further transmission from the peer IC 214.

The peer IC 214 in the method of FIG. 6 may transmit the set of data frames to the power-managed IC beginning with the first data frame that includes the discardable preamble and ending with the last data frame that includes the transmission complete notification (block 610) and the power-managed IC 212 may receive the set of data frames (block 612).

In response to receiving the first data frame of the set, the power-managed IC 212 begins exiting the low-power state (block 312) and discards a portion of the first data frame without discarding any of the payload of the first data frame (block 314). The power-managed IC 212, in response to receiving the last data frame of the set, may immediately re-enter the low-power state (block 614). That is, once the power-managed IC receives and processes the transmission complete notification of the last data frame, the power-managed IC need not wait for a predefined period of inactivity, but rather may immediately (or nearly so) re-enter the low-power state. With such inbound framing techniques, power-state transitions of the power-managed IC may be aggressively and actively controlled. Such aggressive control of power-state transitions of the power-managed IC may provide a reduction in power consumption. Further, the inbound framing techniques may also provide increased data communications efficiency be insuring that payload data is not dropped during a power-managed IC's exit from a low-power state.

Figure 7A:
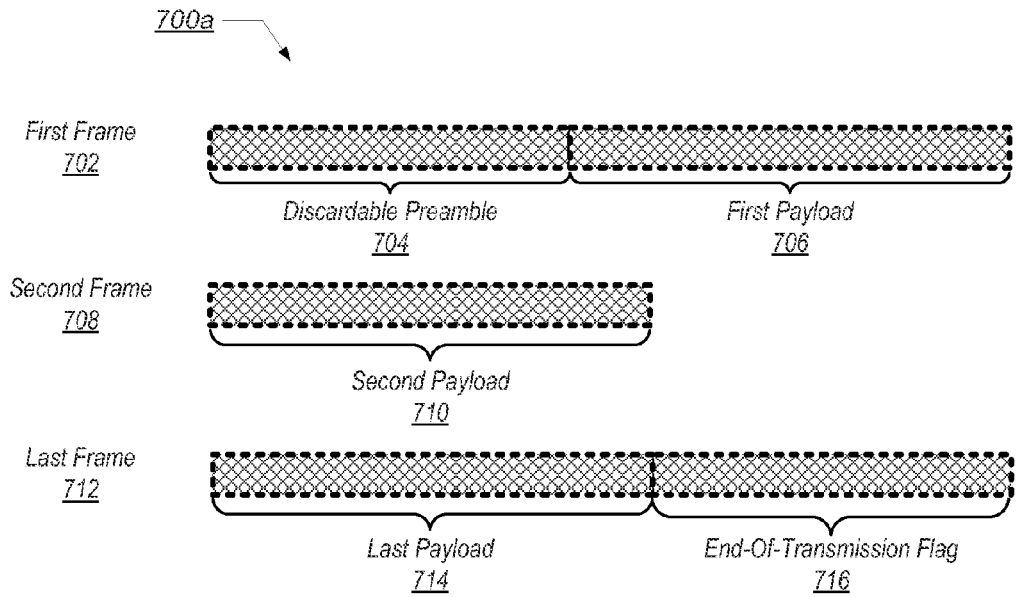
FIG. 7A sets forth a line drawing illustrating an example set of data frames generated by a peer IC for inter-chip data communications.
Figure 7B:
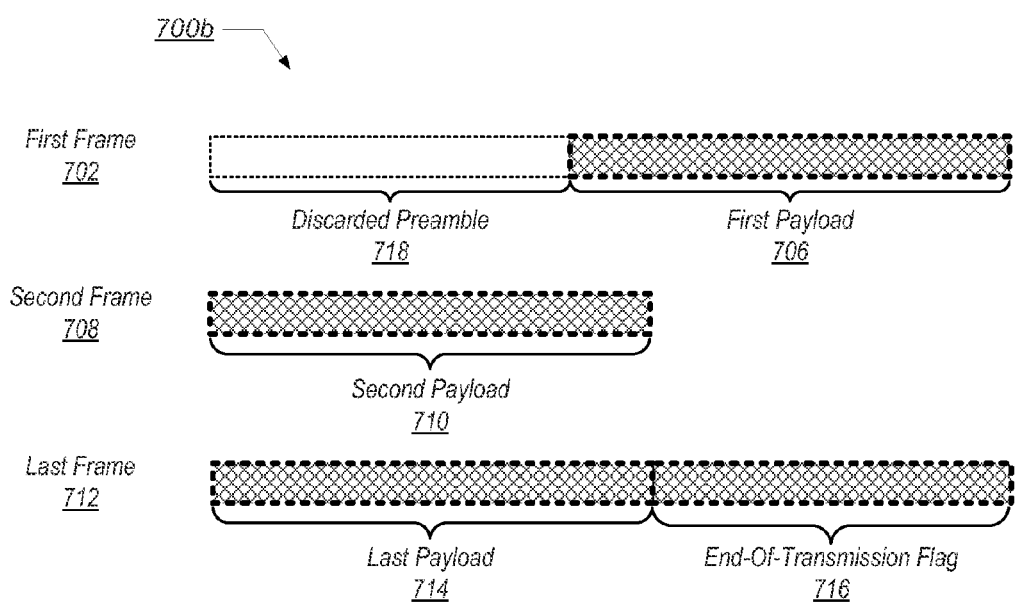
FIG. 7B sets forth a line drawing illustrating an example set of data frames received by a power-managed IC while in a low-power state.

For further explanation, FIG. 7A sets forth a line drawing illustrating an example set of data frames generated by a peer IC for inter-chip data communications as described above with reference to FIG. 3, FIG. 4, FIG. 5, and FIG. 6. FIG. 7B sets forth a line drawing illustrating the same example set of data frames as received by a power-managed IC while in a low-power state.

The example set 700a of data frames generated by a peer IC includes a first data frame 702, a second data frame 708, and a last data frame 712. Although only three data frames are depicted in the example of FIG. 7A, any number of data frames may be included in such a set.

In the example of FIG. 7A, a peer IC has prepended to a payload 706 of the first data frame 702 a discardable preamble 704. As mentioned above, the size of the discardable preamble is greater than the size of data generally discarded by a power-managed IC upon receiving a data frame when in a low-power state.

In generating the second data frame 708 in the set 700a, the peer IC has generated only a payload 710. The peer IC may transmit the second data frame 708 relatively soon after transmitting the first data frame 702 to the power-managed IC. The first data frame will cause the power-managed IC to exit the low-power state and, as such, the second data frame 708 needs no discardable preamble.

For the last data frame 712 in the set 700a, the peer IC has appended to the payload 714 of the last data frame 712 and transmission complete notification implemented as an end-of-transmission flag. The end-of-transmission flag indicates to the power-managed IC that the peer IC will not be transmitting additional data frames for at least some appreciable amount of time.

In FIG. 7B, the power-managed IC receives the set 700b of data frames beginning with the first data frame 702. Responsive to receiving the first data frame 702, the power-managed IC begins exiting the low-power state and, while exiting, discards a portion 718 of the first data frame 702. In the example of FIG. 7B, the power-managed IC discards the entire preamble 704 as depicted by the discarded preamble 718. In this example, the power-managed IC, in discarding the preamble 704, does not discard the payload 706 of the first data frame 702.

In FIG. 7B, the power-managed IC may also receive the second data frame 710 and the second data frame's payload 710. Finally, the power-managed IC may receive the last data frame 712, process the payload 714 of the last data frame 712, and process the end-of-transmission flag 716. Immediately (or relatively so) upon and responsive to processing the end-of-transmission flag 716, the power-managed IC may re-enter the low power state. That is, the power-managed IC need not wait for a period of inactivity to expire prior to re-entering the low-power state.

For the last data frame 712 in the set 700a, the peer IC has appended to the payload 714 of the last data frame 712 and transmission complete notification implemented as an end-of-transmission flag. The end-of-transmission flag indicates to the power-managed IC that the peer IC will, for at least some appreciable amount of time, transmit no additional data frames.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of inter-chip data communications between a power-managed integrated circuit (IC) and a peer IC, the method comprising:
generating, by the peer IC, a data frame, including prepending a discardable preamble of a predefined size to a payload of the data frame, the predefined size comprising a size not less than a size of data discarded by the power-managed IC upon the power-managed IC receiving a data frame while in a low-power state; and
transmitting, by the peer IC to the power-managed IC, the data frame.

2. The method of claim 1, further comprising receiving, by the peer IC from the power-managed IC, a maximum expected time for the power-managed IC to exit the low-power state, wherein generating the data frame further comprises calculating the predefined size of the discardable preamble in dependence upon the maximum expected time for the power-managed IC to exit the low-power state.

3. The method of claim 1, further comprising receiving, by the peer IC from the power-managed IC, a minimum expected time between the power-managed IC exiting and re-entering the low-power state, wherein:
generating the data frame further comprises determining whether the power-managed IC is currently in a low-power state in dependence upon a time of the power-managed IC's most recent exit from the low-power state and the minimum expected time between the power-managed IC exiting and re-entering the low-power state and prepending the discardable preamble only after determining that the power-managed IC is currently in the low-power state.

4. The method of claim 1, wherein:
generating the data frame further comprises generating a set of data frames to be transmitted to the power-managed IC and appending a transmission complete notification to a payload of a last data frame of the set of data frames to be transmitted to the power-managed IC; and
transmitting the data frame further comprises transmitting the set of data frames to the power-managed IC beginning with a first data frame that includes a discardable preamble appended to the first data frame's payload and ending with the last data frame that includes the transmission complete notification appended to the last data frame's payload.

5. The method of claim 1, wherein prepending the discardable preamble further comprises inserting in the preamble a predefined value.

6. A method of inter-chip data communications between a power-managed integrated circuit ('IC') and a peer IC, the method comprising:
receiving, by the power-managed IC while in a low-power state, a data frame from the peer IC, the data frame comprising a payload and a discardable preamble prepended to the payload, the discardable preamble comprising a predefined size;
beginning to exit, by the power-managed IC, the low-power state responsive to receiving the data frame; and
discarding, by the power-managed IC while exiting the low-power state, a portion of the data frame without discarding payload, the discarded portion of the data frame comprising a size not greater than the predefined size of the discardable preamble.

7. The method of claim 6, wherein receiving the data frame from the peer IC further comprises receiving the data frame serially beginning with the discardable preamble followed by the payload.

8. The method of claim 6, wherein receiving the data frame from the peer IC further comprises receiving a set of data frames from the peer IC, where a last data frame of the set comprises a transmission complete notification appended to a payload of the last data frame; and the method further comprises re-entering the low-power state responsive to receiving the transmission complete notification.

9. A peer integrated circuit (IC) configured for inter-chip data communications with a power-managed IC, the peer IC comprising circuitry configured to:
generate a data frame, wherein to generate the data frame, the circuitry is further configured to prepend to a payload of the data frame a discardable preamble of a size, wherein the size is not less than a size of data discarded by the power-managed IC upon the power-managed IC receiving a data frame while in a low-power state; and
the data frame to the power-managed IC.

10. The peer IC of claim 9, wherein the circuitry is further configured to determine the size of a discardable preamble in dependence upon a maximum expected time for the power-managed IC to exit a low-power state.

11. The peer IC of claim 9, wherein the circuitry further comprises a Universal Asynchronous Receiver/Transmitter (UART).

12. The peer IC of claim 9, wherein the peer IC further comprises a computer processor.

13. A system comprising:
a peer integrated circuit (IC) and a power-managed IC, the peer IC operatively coupled to
the power-managed IC for inter-chip data communications, the peer IC configured to:
generate a data frame including prepending a discardable preamble of a predefined size to a payload of the data frame, the predefined size comprising a size not less than a size of data discarded by the power-managed IC upon the power-managed IC receiving a data frame while in a low-power state; and
transmit the data frame to the power-managed IC;
the power-managed IC configured to:
receive, while in a low-power state, the data frame from the peer IC;
begin to exit the low-power state responsive to receiving the data frame; and
discard a portion of the data frame without discarding payload, the discarded portion of the data frame comprising a size not greater than the predefined size of the discardable preamble.

14. The system of claim 13, wherein the power-managed IC is further configured to inform the peer IC of a maximum expected time for the power-managed IC to exit the low-power state and the peer IC is configured to calculate the predefined size of the discardable preamble in dependence upon the maximum expected time for the power-managed IC to exit the low-power state.

15. The system of claim 13, wherein:
the power-managed IC is further configured to inform the peer IC of a minimum expected time duration between the power-managed IC exiting and re-entering the low-power state; and
the peer IC, in generating the data frame, is further configured to:
determine whether the power-managed IC is currently in a low-power state in dependence upon a time of the power-managed IC's most recent exit from the low-power state and the minimum expected time duration between the power-managed IC exiting and re-entering the low-power state; and prepend the discardable preamble to the payload of the data frame only after determining that the power-managed IC is currently in the low-power state.

16. The system of claim 13, further comprising a wireless mobile device.

17. The system of claim 13, wherein the peer IC operatively coupled to the power-managed IC for inter-chip data communications via a Universal Asynchronous Receiver/Transmitter (UART) in the peer IC and a UART in the power-managed IC.

18. The system of claim 13, wherein the peer IC further comprises a computer processor and the power-managed IC further comprises a computer processor.

19. A wireless mobile device comprising:

a peer processor and a power-managed processor, the peer processor operatively coupled to the power-managed processor for serial inter-processor data communications, the peer processor configured to:

prepend a discardable preamble of a predefined size to a payload of a first data frame of a set of data frames to be transmitted to the power-managed processor, the predefined size comprising a size not less than a size of data discarded by the power-managed processor upon the power-managed processor receiving a data frame while in a low-power state;

append a transmission complete notifications to a payload of a last data frame of the set of data frames to be transmitted to the power-managed processor; and transmit the set of data frames to the power-managed processor beginning with the first data frame and ending with the last data frame; and the power-managed processor is configured to:

receive, while in a low-power state, the first data frame from the peer processor;

begin exiting the low-power state responsive to receiving the first data frame;

discard a portion of the first data frame without discarding the payload while exiting the low-power state, the discarded portion of the data frame comprising a size not greater than the predefined size of the discardable preamble; and re-enter the low-power state responsive to receiving the transmission complete notification of the last data frame.

20. The wireless mobile device of claim 19, further comprising logic configured to receive, from the power-managed processor, a maximum expected time for the power-managed processor to exit the low-power state and calculate the predefined size of the discardable preamble in dependence upon the maximum expected time for the power-managed processor to exit the low-power state.

* * * * *